Figure 1:
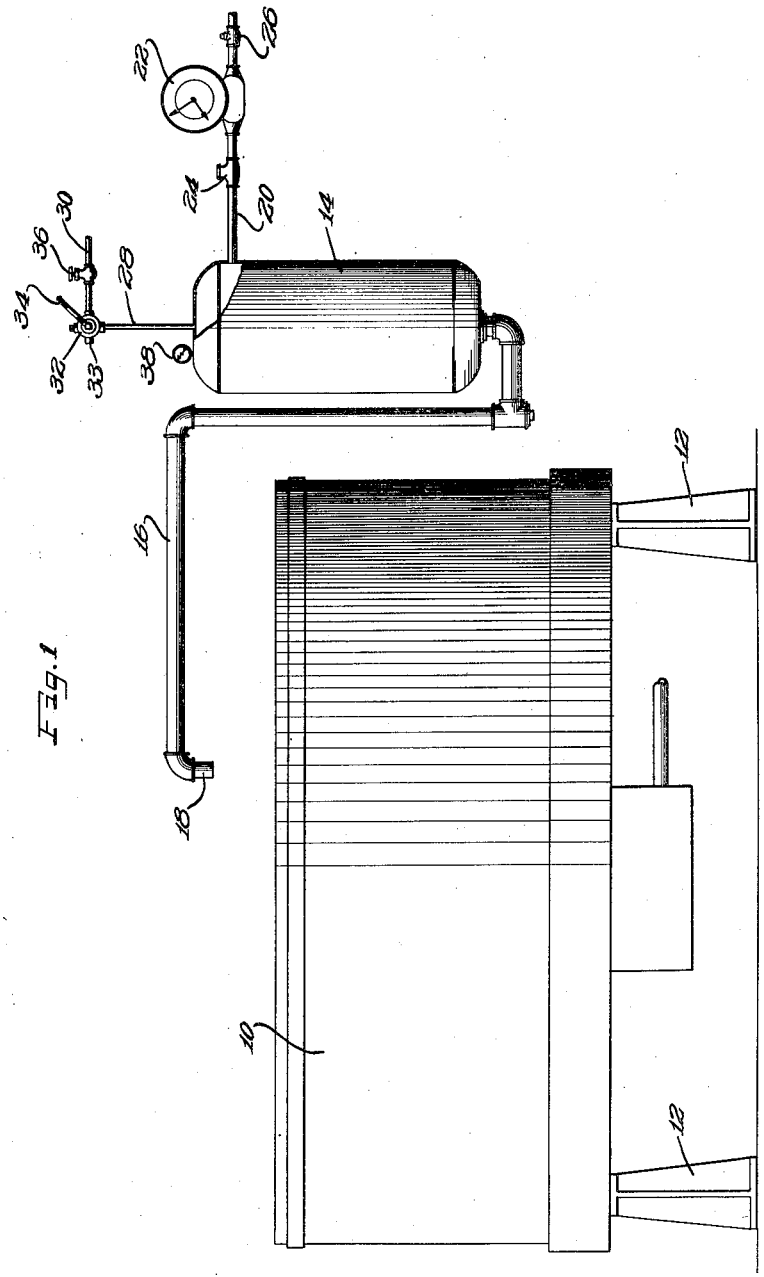

April 17, 1951 W. HORTH 2,549,603
METHOD OF MULLING MATERIAL
Filed April 12, 1949

Inventor
Walter Horth

By Thos Irwin of Charles H Hill Attys

Patented Apr. 17, 1951

2,549,603

UNITED STATES PATENT OFFICE 2,549,603

METHOD OF MULLING MATERIAL

Walter Horth, Wilmette, Ill., assignor, by mesne assignments, to Herbert S. Simpson, Evanston, Ill., as trustee Application April 12, 1949, Serial No. 87,069

1 Claim. (Cl. 22—217)

This invention relates to a method of delivering liquid. More particularly, it has to do with the method of delivering a predetermined quantity of liquid to a processing station within a predetermined time limit.

In many processes, and particularly in the mixing and mulling of foundry sand, it is necessary that water be introduced to the mixture within a very short period of time in order to obtain optimum results.

In the case of foundry sand the water is introduced to the mixture after the sand and bonding materials have been charged in the muller. Since the length of the mulling cycle depends in a large degree upon the ability to develop bonding strength in the sand rapidly, it is essential that water be introduced as speedily as possible. Applicant has found that if the addition of water is completed within 5 to 10 seconds, very good results can be obtained in the mulling cycle.

Furthermore, the speedy introduction of water will reduce the time in which the sand grains and the bonding material are in the dry state subject to dust development and loss of material in exhaust air currents. While in the dry state, sand and bonding materials are also much more abrasive and produce accelerated wear on the rotating and stationary parts of the mixer.

While the desirability of a speedy introduction of water has been recognized, it very often happens that foundries have inadequate water piping systems, due to the increased use of water for dust collecting equipment and sanitary facilities. Thus the water pressure at the processing station is often much too low to effect the rapid introduction of water to the fixture, and in many cases as much as 90 seconds is required for this step in the operation.

According to the features of the present invention, there is provided a storage tank in which a measured quantity of water is deposited. This storage tank has discharge piping leading to the mixer and it also has a piping connection leading from the top of the storage tank to a source of air under pressure. When the time comes for introducing water to the mixture, a valve in the air line is opened and air under pressure enters the tank and displaces the water therein, and the water is discharged into the mixture at a rapid rate which may be controlled by the setting of a needle valve in the air line. It has been found that by using the proper piping and an air pressure of 15 pounds per square inch, 20 gallons of water may be delivered to the mixture in 7 seconds.

It is, therefore, an important object of this invention to provide a novel method of mulling material including the novel steps of adding water according to the teachings of this invention.

Another object of the present invention is to provide a novel method of quickly transferring a predetermined quantity of liquid from one container to another.

A still further object of this invention is to provide a novel method of delivering a quantity of liquid from one container to another at a regulated rate of delivery.

Another object of this invention is to provide a method of delivering a quantity of liquid from one container to another that is efficient in operation and which makes use of simple, relatively inexpensive equipment.

Other and further features will become apparent to one skilled in the art from the following detailed description and the annexed sheet of drawing.

On the drawing:

Figure 1 is a fragmentary side elevational view, with parts broken away, of the equipment designed to permit the practice of the novel method of the present invention.

The reference numeral 10 designates a mulling machine of standard design mounted on leg members 12. This mulling machine may be advantageously constructed according to the disclosure in the patent to Christensen No. 2,413,603. Positioned adjacent the muller 10 and supported by any suitable structure there is provided a storage tank 14 which has a capacity adequate to accommodate the amount of water that is required to be supplied to the maximum batch accommodated in the mixer 10. At the lower end of the tank a discharge piping assembly is threaded therein which includes a nipple 18 defining the exit point of the water from the discharge pipe. It is to be particularly noted that this exit point 18 must be above the top of the tank 14 in order to prevent syphoning action.

At the upper portion of the side wall of the tank 14 there is connected a pipe 20 which leads to a source of water. A water meter 22 is connected in the inlet pipe 20 for measuring the amount of water delivered to the tank. On the discharge side of the water meter there is provided an automatically operating check valve 24 which prevents the backward flow of water in the line 20. An operating valve 26 may be advantageously disposed in the line 20 on the inlet side of the water meter 22 to stop flow of water through the meter after the required amount of water has been delivered to the tank 14.

A pipe 28 is threaded into the top wall of the tank. This pipe is in communication with a pipe 30 which leads to a source of air under pressure. A valve 32, having a handle member 34, is connected between the lines 28 and 30 to control flow of air to the tank 14. The rate of flow of air into the line 28 and then into the tank 14 may be controlled by the adjustment of a needle valve 36 disposed in the line 30. The valve 32 is a three-way valve having a connection 33 providing a vent to atmosphere. When water is directed into the tank 14, the displaced air is released through this vent.

To measure the pressure in the tank 14 at any time there is provided a pressure gauge 38 which is threaded into the top wall of the tank 14.

To put the device of the present invention into operation, the valve 26 is opened and water is permitted to flow into the tank 14 until the water meter 22 indicates that the required amount of water has been admitted to the tank 14. The valve 26 is then closed. When it is desired to introduce water into the mixture in the mixing machine 10, the valve 32 is opened by means of the handle 34 permitting communication of the pipe 28 with the inlet pipe 30, and air under pressure is introduced to the top of the inside of the tank. The incoming air displaces the water in the tank and forces it through the discharge piping 16 into the mixer 10. When the water is discharged into the tank 14, the valve 32 will again be closed.

In a modification of the method of the present invention, the hand-operated valve 32 is replaced by a solenoid valve the operation of which is remotely controlled by means of an automatically controlled master control unit which coordinates the introduction of water to the mulling machine with the operation of the machine itself and introduces water at a predetermined portion of the mulling cycle.

From the foregoing description it will be recognized that there is provided in this invention a simple, efficient method of transferring liquids from one container to another in a very short period of time. This novel method makes it possible for a foundry to efficiently process foundry sand regardless of the capacity or pressure conditions in the water supply system in the foundry.

In foundries where an inadequate water supply piping is used it is necessary to use a water meter that is relatively expensive due to the large orifices and passages required in the meter to pass the required amount of water at a low pressure.

By use of the equipment of the present invention a flow meter having smaller passages therethrough and being approximately half as expensive may be employed. Thus, not only is a cheaper, more efficient process disclosed by this application but also the equipment employed in this invention is very economical compared to equipment used to carry out the same functions using standard methods.

While the novel method of this invention has been described and shown as employed in an installation for mulling foundry sand, it will, of course, be recognized that this method of adding water to a processing station may be used in many other similar installations. It is also evident, of course, that the method may be used for the addition of any other type of liquid which must be rapidly introduced into a processing machine.

It will, of course, be understood that various details of construction may be varied through a wide range without departing from the principles of this invention, and it is, therefore, not the purpose to limit the patent granted hereon otherwise than necessitated by the scope of the appended claim.

I claim as my invention:

In a method of mulling, in a crib, foundry sand, including sand grains and bonding material, to conditions and develop rapidly bond strength in the sand, the steps of delivering a given batch of sand to the crib, mulling the sand, discharging a given quantity of metered liquid, coordinated with the size of the batch of sand, to a confined storage area in proximity to and positioned to discharge its contents into the crib, displacing and venting the air from said area by the incoming metered liquid, closing the vent of said area and delivering air under pressure directly to the top of said area above the column of liquid therein, and controlling the pressure of such air delivered to the area for forcing the liquid out through the discharge of the area rapidly into the crib at a controlled rate and contemporaneous with the mulling of the sand, whereby to minimize dust development in the sand.

WALTER HORTH.

REFERENCES CITED

The following references are of record in the file of this patent:

UNITED STATES PATENTS

| Number | Name | Date |
|---|---|---|
| 1,201,200 | Kurze | Oct. 10, 1916 |
| 1,688,661 | Runyan | Oct. 23, 1928 |
| 2,420,392 | Christensen | May 13, 1947 |